United States Patent
Hsu et al.

(10) Patent No.: US 12,328,657 B2
(45) Date of Patent: Jun. 10, 2025

(54) SYSTEM AND METHODS FOR EDGE-BASED GEO-AWARE ROUTING

(71) Applicant: Verizon Patent and Licensing Inc., Basking Ridge, NJ (US)

(72) Inventors: Sean Hsu, San Francisco, CA (US); Brian Peebles, Cranford, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 479 days.

(21) Appl. No.: 17/929,856

(22) Filed: Sep. 6, 2022

(65) Prior Publication Data
US 2024/0080745 A1     Mar. 7, 2024

(51) Int. Cl.
*H04W 40/20* (2009.01)
*H04W 4/02* (2018.01)
*H04W 4/44* (2018.01)

(52) U.S. Cl.
CPC ........... *H04W 40/20* (2013.01); *H04W 4/025* (2013.01); *H04W 4/44* (2018.02)

(58) Field of Classification Search
CPC ....... H04W 40/20; H04W 4/025; H04W 4/44; H04W 4/021; H04W 4/40
See application file for complete search history.

(56) References Cited

U.S. PATENT DOCUMENTS

| | | | |
|---|---|---|---|
| 2016/0283515 A1* | 9/2016 | Moussalli | G01S 19/13 |
| 2024/0087447 A1* | 3/2024 | Cook | G06F 16/90335 |

OTHER PUBLICATIONS

Rui Wu, GeoTAR: A Map-Based and Traffic-Aware VANET Routing in Urban Scenario (Year: 2019).*

* cited by examiner

*Primary Examiner* — Tejis Daya

(57) ABSTRACT

Systems and methods described herein provide location-based routing for edge networks. A network device receives routing rules associating geohash tiles, for a region of interest, with one or more virtual Road Side Units (vRSUs). The network device receives a message from a vehicle client in the region of interest. The message includes a message header that identifies geospatial coordinates of a vehicle. The network device calculates a geohash based on the geospatial coordinates in the message header and associates, based on the routing rules, the geohash with one of the vRSU. The network device routes the message to the one of the vRSUs based on the associating.

20 Claims, 9 Drawing Sheets

SYSTEM AND METHODS FOR EDGE-BASED GEO-AWARE ROUTING

BACKGROUND

To reduce the number of road accidents and to enhance road safety, vehicles are being developed that can obtain information related to what is happening in the area around the vehicle, foresee what may happen next, and take protective action. Such vehicles may need to be able to exchange messages with each other in order to reduce the number of collisions.

Today's vehicle and road sensors, such as radar, lidar, and/or ultrasonic detectors may not be able to obtain information out of line-of-sight of a vehicle or outside a particular detection range. With the emergence of Vehicle-to-Everything (V2X) systems that include a wireless communication systems, however, vehicles may be able share information with each other via a communication channel and may enable vehicles to receive more information about the environment and other vehicles than vehicle and/or road sensors by themselves. A V2X system may enable and/or include Vehicle-to-Vehicle (V2V) communication, Vehicle-to-Pedestrian (V2P) communication, Vehicle-to-Infrastructure (V2I) communication, and/or other types of communication associated with vehicles.

DETAILED DESCRIPTION OF EXAMPLE EMBODIMENTS

Figure 1:
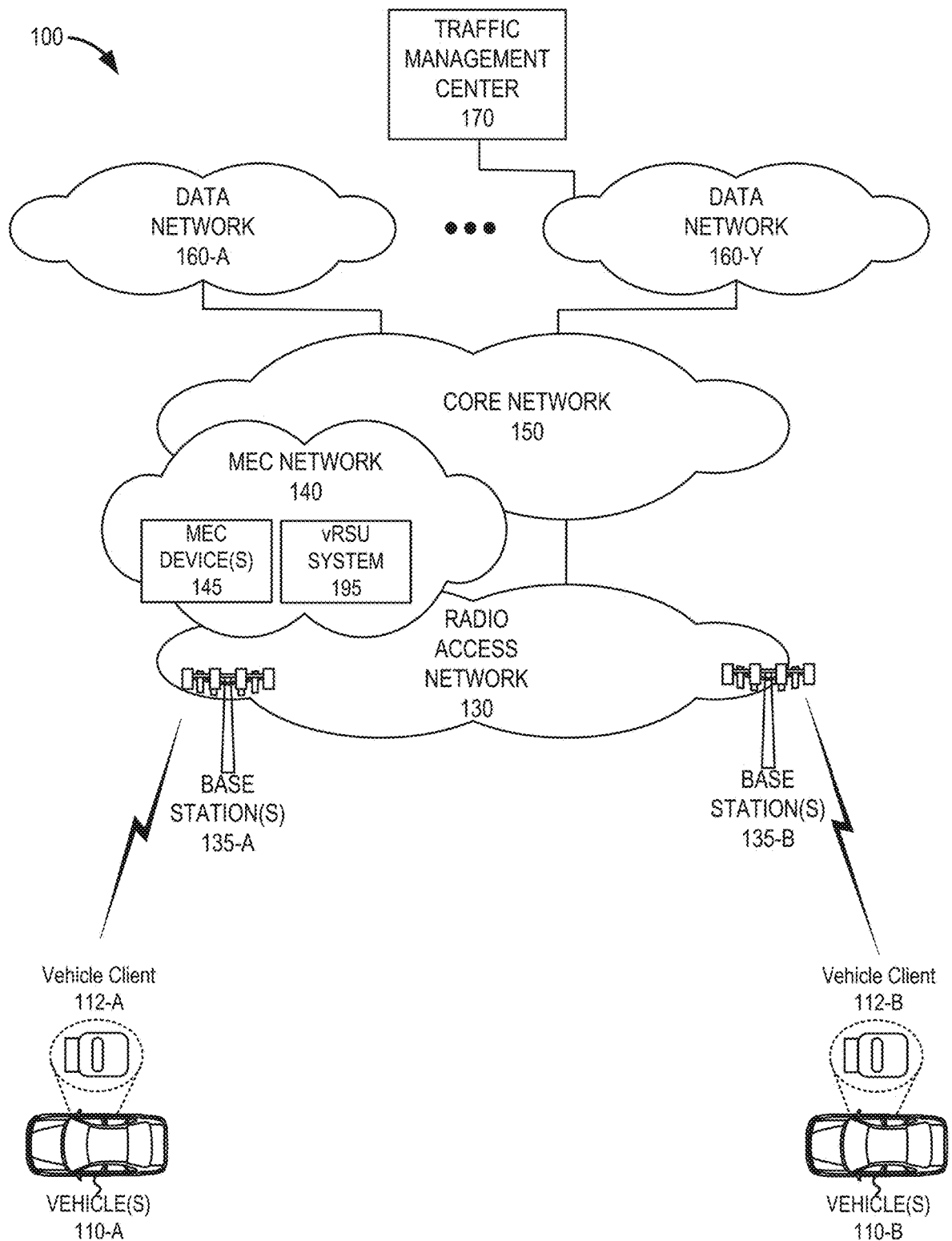
FIG. 1 is a diagram that depicts an example of an environment in which systems and methods described herein may be implemented.

The following detailed description refers to the accompanying drawings. The same reference numbers in different drawings may identify the same or similar elements. Also, the following detailed description does not limit the invention.

Vehicle-to-Everything (V2X) systems can generate a large amount of message traffic, which needs to be processed based on where the endpoints (e.g., vehicles, telematics units, mobile devices, infrastructure, etc.) are located. For V2X systems that cover extended areas, a geo-aware packet (or message) router can sort messages into relevant geographic boundaries and help vehicles communicate with each other in real time.

In the realm of Automotive Safety communications, infrastructure communications are conducted via a Road-side Unit (RSU) which receives Basic Safety Messages (BSM) from vehicles and sends critical infrastructure messages to the vehicles. These infrastructure messages include traffic light Signal Phase and Timing (SPAT), Road-side Alerts (RSA), and Traveler Information Messages (TIM). Traditionally, these RSUs are physical boxes mounted on traffic poles and come with radios and a limited processing capability to evaluate traffic conditions and send appropriate messages. A physical RSU typically has a radio range of about one kilometer and would usually be deployed at each intersection or alongside a roadway to provide coverage at critical areas such as curves or work zones. Each of these physical RSUs works independently of each other and only serves the immediate area of its radio coverage.

With the advent of Multi-access Edge Compute (MEC) systems for cellular radio networks, the physical RSU can now be virtualized inside an edge device. Rather than deploying a network of discrete, physical RSUs, a virtual RSU (vRSU) can be set up to cover any arbitrary geographic area. The required low latency, high processing capacity, and high processing speed for a vRSU may be achieved with a wireless 5G NR connection to a base station and a MEC network associated with the base station. For example, a vRSU in a MEC network communicating with client devices using 5G NR wireless signals may receive a V2X message, determine which client devices should receive the V2X message, and send the V2X message to the determined client devices within 50-100 milliseconds (ms). In comparison, other wireless network technologies may experience latencies of 200 ms or more, which may not be adequate to warn a vehicle in time to avoid a collision. Thus, when coupled with a cellular radio network, the vRSU approach can provide near blanket coverage of all intersections and roadways served by the cellular network. For example, a vRSU can be used to set up geofences at any arbitrary location to provide BSMs, such as work zone warnings, curve speed warnings, and back of queue warnings, to approaching vehicles.

While a physical RSU has limited coverage and can handle the traffic load in a single intersection or small segment of roadway, a vRSU, in contrast, is not limited by a particular signal coverage area. With vRSUs, there is no need for partitioning a single instance to a single intersection or road segment. Because the vRSU allows for contiguous coverage of road segments and intersections throughout a cellular network, data can be exchanged between adjacent geofenced areas. This capability allows for continuous monitoring of a great many vehicles simultaneously. However, eliminating the natural coverage areas defined by signal strength limits of a physical RSU presents a different challenge for vRSU systems—namely, efficiently associating V2X messages from multiple vRSU coverage areas with the correct vRSU for the designated coverage area.

In vehicle safety use cases, it is critically important to process all vehicle data in common association with their relative, immediate geographic locations. Vehicles approaching a hazard must be managed in a common way to keep them operating in concert and from colliding. The challenge this represents is the need to scale the vRSU processing in a way that allows a vRSU system to maintain partitioning of incoming BSMs such that vehicles which are near each other are monitored collectively.

As the adoption of connected vehicles starts to grow, the need for increased V2X communications will grow also. For example, traffic flows in highway segments of major metropolitan areas can exceed 20,000 vehicles at any given time, many of which will eventually be connected vehicles. Processing data associated with this many vehicles in a small geographical area requires the vRSU to be able to sort data as a function of the endpoint locations. To accomplish this geographic sorting, a vRSU system needs to be able to route incoming messages to processor instances that are allocated to a specific geographic area (such as an intersection or segment of highway). Essentially, a geo-aware packet (or message) router is needed to help vehicles communicate with each other in real time.

Systems and methods described herein may be used to subdivide a large geographical region into a subset of smaller segments (e.g., rectangular segments referred to as geohash tiles) and distribute traffic management of these segments across various system nodes based on dynamic metrics. According to one implementation, a network device, such as a protocol proxy, may receive routing rules associating geohash tiles, for a region of interest, with one or more vRSUs. The network device may receive a message from a vehicle client in the region of interest. The message may include a message header that identifies geospatial coordinates of a vehicle. The network device may calculate a geohash based on the geospatial coordinates in the message header and associate, based on the routing rules, the geohash with one of the vRSU. The network device may route the message to the one of the vRSUs based on the association.

FIG. 1 is a diagram of an exemplary environment 100 in which the systems and/or methods, described herein, may be implemented. As shown in FIG. 1, environment 100 may include one or more vehicles 110-A and 110-B (referred to collectively as vehicles 110 and generically as vehicle 110) that include vehicle clients 112-A and 112-B (referred to collectively as vehicle clients 112 and generically as vehicle client 112), a radio access network (RAN) 130 that includes base station(s) 135, a MEC network 140 that includes MEC devices 145, a core network 150, data networks 160-A to 160-Y, and a traffic management center 170.

Vehicles 110 may include motorized vehicles in an area serviced by RAN 130 and/or area serviced by vRSU system 195. Each vehicle may include a vehicle client 112 installed in the vehicle. In one example, vehicle client 112 may be in the form of an on-board diagnostics (OBD) device plugged into an OBD port of vehicle 110. Vehicle client 112 may collect information relating to the status and operation of vehicle 110. For example, vehicle 110-A may include vehicle client 112-A that communicates with base station 135-A using cellular wireless signals. Furthermore, vehicle clients 112 may include (or communicate with) a collection of sensors and receivers, such as a Global Positioning System (GPS) receiver, a Real-Time Kinematic (RTK) receiver, a compass, an accelerometer, that generate information relating to the movement of vehicle 110. As used herein, vehicle 110 and vehicle client 112 may be used interchangeably to refer to a vehicle 110 equipped with vehicle client 112 unless indicated otherwise.

RAN 130 may enable vehicle clients 112 (and other devices perceived as User Equipment devices (UE devices or UEs) by base station 135) to connect to core network 150 via base stations 135 using cellular wireless signals. For example, RAN 130 may include one or more central units (CUs) and distributed units (DUs) (not shown in FIG. 1) that enable and manage connections from base station 135 to core network 150. RAN 130 may include features associated with a 5G core network, an LTE Advanced (LTE-A) network and/or another advanced network. RAN 130 may perform: management of 5G NR base stations; carrier aggregation; advanced or massive multiple-input and multiple-output (MIMO) configurations (e.g., an 8×8 antenna configuration, a 16×16 antenna configuration, etc.); provide support for relay stations; provide support for Heterogeneous Networks (HetNets) of overlapping small cells and macrocells; provide support for Self-Organizing Network (SON) functionality; provide support for Machine-type Communications (MTC) functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or provide support for other types of LTE-A and/or 5G functionality. Base station 135 may be associated with MEC network 140.

MEC network 140 may provide MEC services for UE devices, such as vehicle client 112, attached to base station 135. MEC network 140 may be in proximity to the one or more base stations 135 from a geographic and network topology perspective. As an example, MEC network 140 may be located on a same site as base station 135. As another example, MEC network 140 may be geographically closer to base station 135, and reachable via fewer network hops and/or fewer switches, than other base station and/or data networks 160. As yet another example, MEC network 140 may be reached without having to interface with a gateway device, such as a 4G Packet Data Network Gateway (PGW) or a 5G User Plane Function (UPF).

MEC network 140 may interface with RAN 130 and/or with core network 150 via a MEC gateway device (not shown in FIG. 1). In some implementations, MEC network 140 may be connected to RAN 130 via a direct connection to base station 135. For example, MEC network 140 may connect to a gNodeB via an N3 interface. In other implementations, MEC network 140 may include, or be included in, core network 150. As an example, MEC network 140 may connect to a Session Management Function (SMF) via an N4 interface. MEC network 140 may support UE device mobility and handover application sessions between MEC network 140 and another MEC network.

MEC network 140 may include a MEC device 145. MEC network 140 may support device registration, discovery, and/or management of MEC devices 145 in MEC network 140. MEC device 145 may include particular hardware components, such as central processing units (CPUs), graphics processing units (GPUs), tensor or dataflow processing units, hardware accelerators, and/or other types of hardware components. Furthermore, MEC device 145 may include particular software components, such as a particular operating system, virtual machine, virtual container, application, and/or another type of software components or programs. MEC device 145 may connect to base station 135 in RAN 130 and provide one or more MEC services to UE devices connected to base station 135. Consistent with implementations described herein, MEC device 145 may be configured to include a vRSU systems 195 that enable V2X communication with vehicle clients 112 and other V2X devices.

Core network 150 may manage communication sessions for UE devices serviced by base station 135. For example, core network 150 may establish an Internet Protocol (IP) connection between UE devices and a data network 160.

Furthermore, core network 150 may enable UE devices to communicate with an application server, and/or another type of device, located in a data network 160 using a communication method that does not require the establishment of an Internet Protocol (IP) connection between a UE device and data network 160, such as, for example, Data over Non-Access Stratum (DoNAS). For example, in other implementations, a vRSU may be included in a server device in core network 150, rather than in MEC device 145 in MEC network 140.

In some implementations, core network 150 may include a 5G core network. A 5G core network may include devices that implement network functions that include an Access and Mobility Function (AMF) to perform registration management, connection management, reachability management, mobility management, and/or lawful intercepts; an SMF to perform session management, session modification, session release, IP allocation and management, Dynamic Host Configuration Protocol (DHCP) functions, and selection and control of a UPF; a UPF to serve as a gateway to data network 160, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device; and/or other types of network functions. In other implementations, core network 150 may also include an LTE core network (e.g., an evolved packet core (EPC) network) with corresponding network devices/functions.

Data networks 160-A to 160-Y may each include a packet data network. A particular data network 160 may be associated with a Data Network Name (DNN) or an Access Point Name (APN) and a UE device may request a connection to the particular data network 160 using the DNN or APN. Data network 160 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, a private 5G network, and/or an LTE network), an ad hoc network, an intranet, or a combination of networks.

Traffic management center 170 may include one or more computer devices, such as server devices, configured to manage operations of a V2X system. Traffic management center 170 may include, for example, a map system to generate and/or maintain maps of the area associated with base stations 135 and/or vRSU systems 195. Traffic management center 170 may also include an alert system to generate V2X messages based on information obtained from vehicle clients 112 and other devices. As an example, the alert system may receive information from road sensors that sense the presence of vehicles 110, such as road sensors that detect traffic congestion, vehicle accidents, hazardous road conditions, road construction, road closures, and/or other types of road conditions. Traffic management center 170 may further include a traffic light controller to control traffic lights, such as to extend the duration of a red or green traffic light of a particular traffic light based on traffic messages.

Each vRSU system 195 may be instantiated in a MEC device 145 to communicate with vehicle clients 112 and other devices (e.g., cameras, traffic lights, other vRSUs, etc.) in a designated coverage area. For example, vRSU 195 may receive Basic Safety Messages (BSM) from vehicle clients 112 and send critical infrastructure messages to the vehicle clients 112 and other devices. As used herein, a BSM may refer to any standardized data packet or positional message used in connected vehicle systems that contains the vehicle position, heading, speed, and other information relating to a vehicle's state and predicted path. These infrastructure messages may include traffic light Signal Phase and Timing (SPAT), Road-side Alerts (RSA), and Traveler Information Messages (TIM) for the designated coverage area. Generally, all vehicles 110 (and other devices) in the same coverage area (e.g., a geohash tile, as described further herein) need to be managed by the same vRSU system 195 to assure accurate safety and traffic management. According to implementations described herein, the number of vRSU systems 195 and size of their corresponding coverage area may be adjusted to accommodate changing traffic loads.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
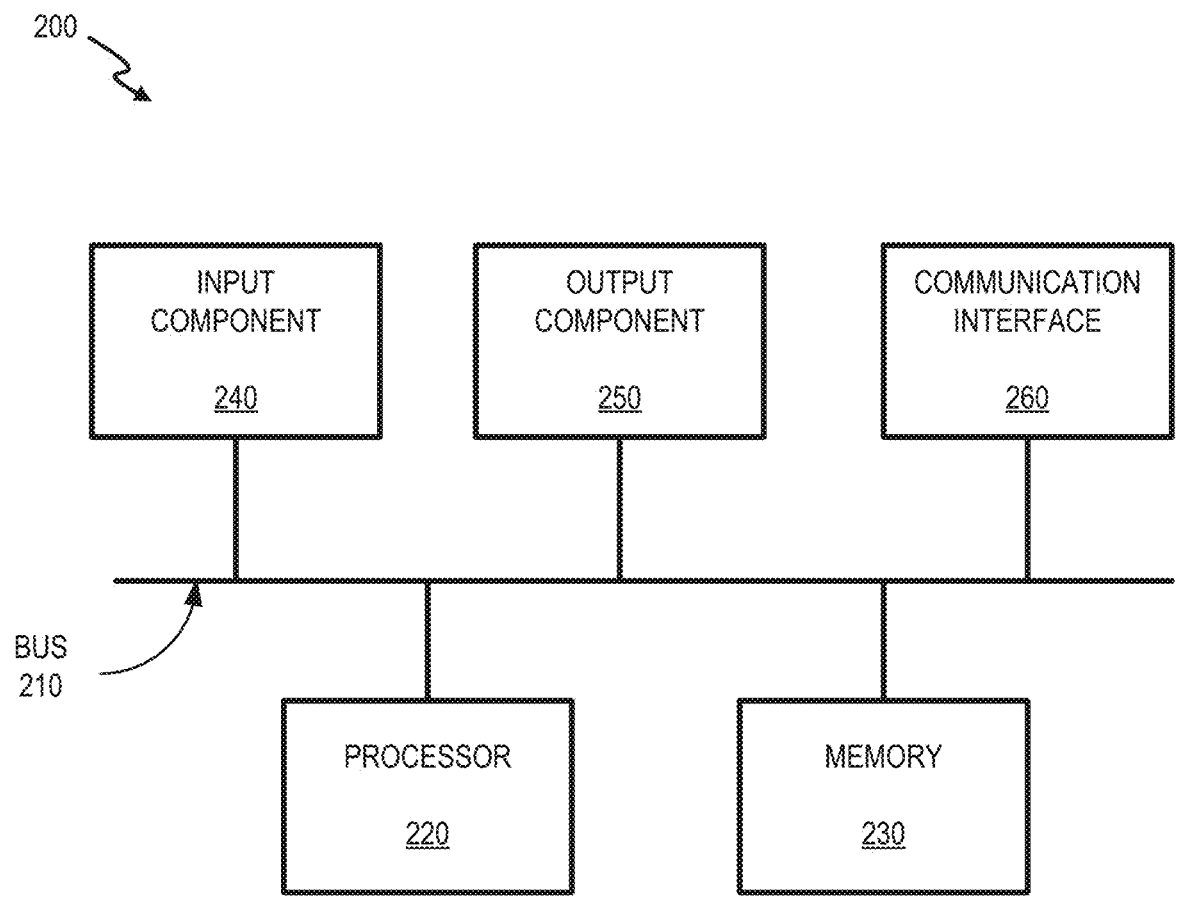
FIG. 2 is a diagram of example components of a device according to an implementation described herein.

FIG. 2 is a diagram illustrating example components of a device 200 according to an implementation described herein. Vehicle client 112, base station 135, MEC device 145, and/or traffic management center 170 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to a geo-aware routing system, such as a routing system for V2X messages. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
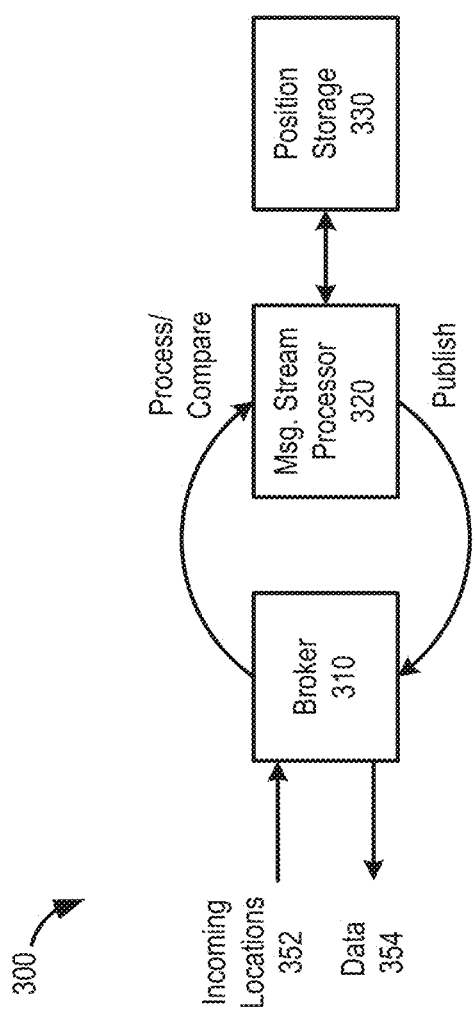
FIG. 3 is a diagram illustrating exemplary logical components of a virtual Road Side Unit (vRSU) that may be implemented in a vRSU system.

FIG. 3 is a diagram illustrating exemplary logical components of a vRSU 300 that may be implemented in vRSU system 195. The components of vRSU 300 may be implemented, for example, in a MEC device 145 via processor 220 executing instructions from memory 230. Alternatively, some or all of the components of MEC device 145 may be implemented via hard-wired circuitry. Furthermore, some or all of the components of MEC device 145 may be implemented using one or more hardware accelerators, such as GPUs, tensor or dataflow processing units, and/or other types of hardware accelerators. Although vRSU 300 is described as being included in MEC device 145, in other implementations, some or all of the components of vRSU 300 may be implemented in a device outside of MEC network 140 (e.g., in core network 150) and may be coupled to low latency device (e.g., hardware accelerators) of MEC device 145 as needed to perform low latency processing.

As shown in FIG. 3, vRSU 300 may include a broker 310, a message stream processor 320, and position storage 330. Broker 310 may include a software broker to receive messages from client devices, such as vehicle clients 112. Broker 310 may publish the received messages to message stream processor 320. Furthermore, broker 310 may receive a client-specific V2X message from message stream processor 320 and may publish the received client-specific V2X message to a component that is enabled to deliver the client-specific V2X message to the client device. In some implementations, broker 310 may publish V2X messages using Message Queueing Telemetry Transport (MQTT). In other implementations, message broker 320 may use a different publish-subscribe protocol to distribute V2X messages.

Message stream processor 320 may publish V2X messages to particular client devices. For example, mobility message service 340 may receive a V2X message over MQTT and determine which client devices are to receive the V2X message. Mobility message service 340 may maintain information relating to the location of each client device in position storage 330. Mobility message service 340 may identify client devices, located within a particular distance of the determined location associated with the V2X message, that are subscribed to receive V2X message of the determined message type.

Position storage 330 may include a database, for example, to store one or more client position records. Each client position record may store information on a particular registered client device (e.g., for vehicle client 112). Example fields of a client position record may include a client ID field, a position field, a speed/direction field, and a relevant geographic area field.

As shown in FIG. 3, a message from a vehicle client 112, for example, regarding the vehicle 110 position may be published 352 to broker 310. Broker 310 may enqueue the message and wait for message stream processor 320 to dequeue the message and compare vehicle client's 112 location to locations of other vehicles. The location information of vehicle clients 112 are all kept in position storage 330. This same approach may be simultaneously used for every other vehicle client 112 in a coverage area of vRSU 300. As further shown in FIG. 3, in some instances, message stream processor 320 may generate a return message 354 to one or more vehicle clients 112 via broker 310.

Figure 4:
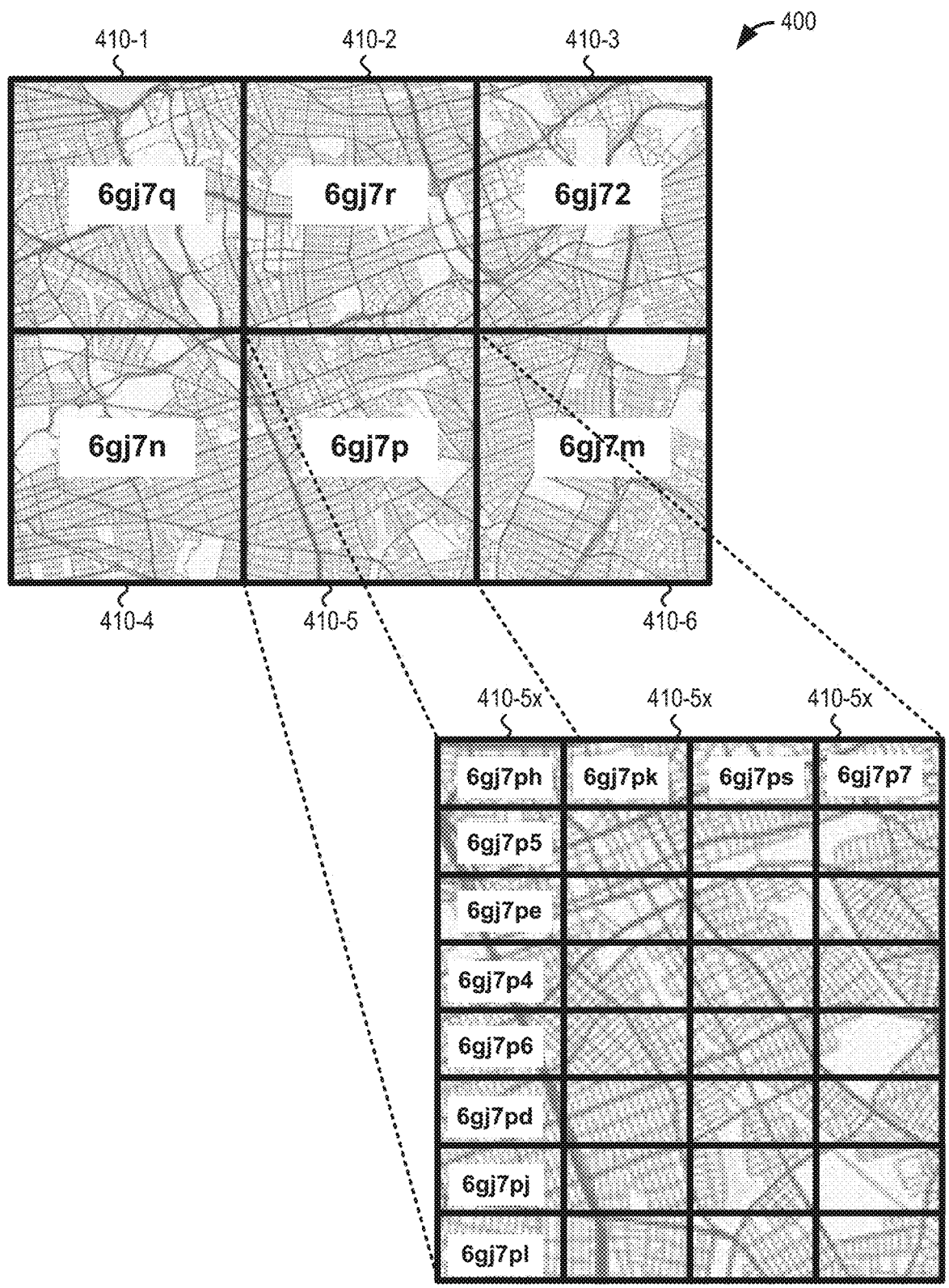
FIG. 4 is a diagram illustrating geohash tile allocations that may be used for a vRSU system.

FIG. 4 is a diagram illustrating geohash tile allocations that may be used for vRSU system 195. A geohash may be considered a way of encoding a longitude and latitude into an alphanumeric string. The geohash algorithm is bidirectional, allowing geographic coordinates to be encoded into geohashes and geohashes to be decoded to into coordinates. The encoding process for a geohash creates a range of interest for each geohash. A geohash represents a rectangular area, referred to as a geohash tile, in contiguous slices, where the geohash corresponds to the centroid of the geohash tile.

FIG. 4 illustrates a portion of a region of interest 400 that includes 6 geohash tiles 410-1 through 410-6 (referred to collectively as geohash tiles 410). The more characters a geohash has, the more precision it has (e.g., the size of a geohash tile shrinks). Thus, an existing geohash tile 410 (e.g., 410-5 of FIG. 4) can be subdivided into multiple children geo-hash tiles 410, such as 32 children tiles (e.g., tiles 410-5x of FIG. 4), whose geohash may be obtained from its parent geohash by adding a character to the end of the parent geohash string. Generally, the number of characters in a geohash corresponds to a particular geohash tile size. For example, a geohash string with three digits (e.g., "6gj") may define a geohash tile with an area of about 156 square kilometers (e.g., measured near the equator); while a geohash string with five digits (e.g., "6gj7q") may define a geohash tile with an area of about 4.9 square kilometers.

As described further herein, a region of interest may be divided into geohash tiles 410 of various sizes that are stored in a map that is used for location-based message routing. Each of geohash tiles 410 may be assigned to a vRSU 300/broker 310, where all message traffic within an assigned geohash tile 410 may be directed to a single broker 310. Multiple geohash tiles 410 may be assigned to the same vRSU 300/broker 310. The assignment of geohash tiles 410 to a broker 310 and the size/precision of geohash tiles 410 may be dynamically adjusted to provide efficient scaling and loading in vRSU system 195.

Figure 5:
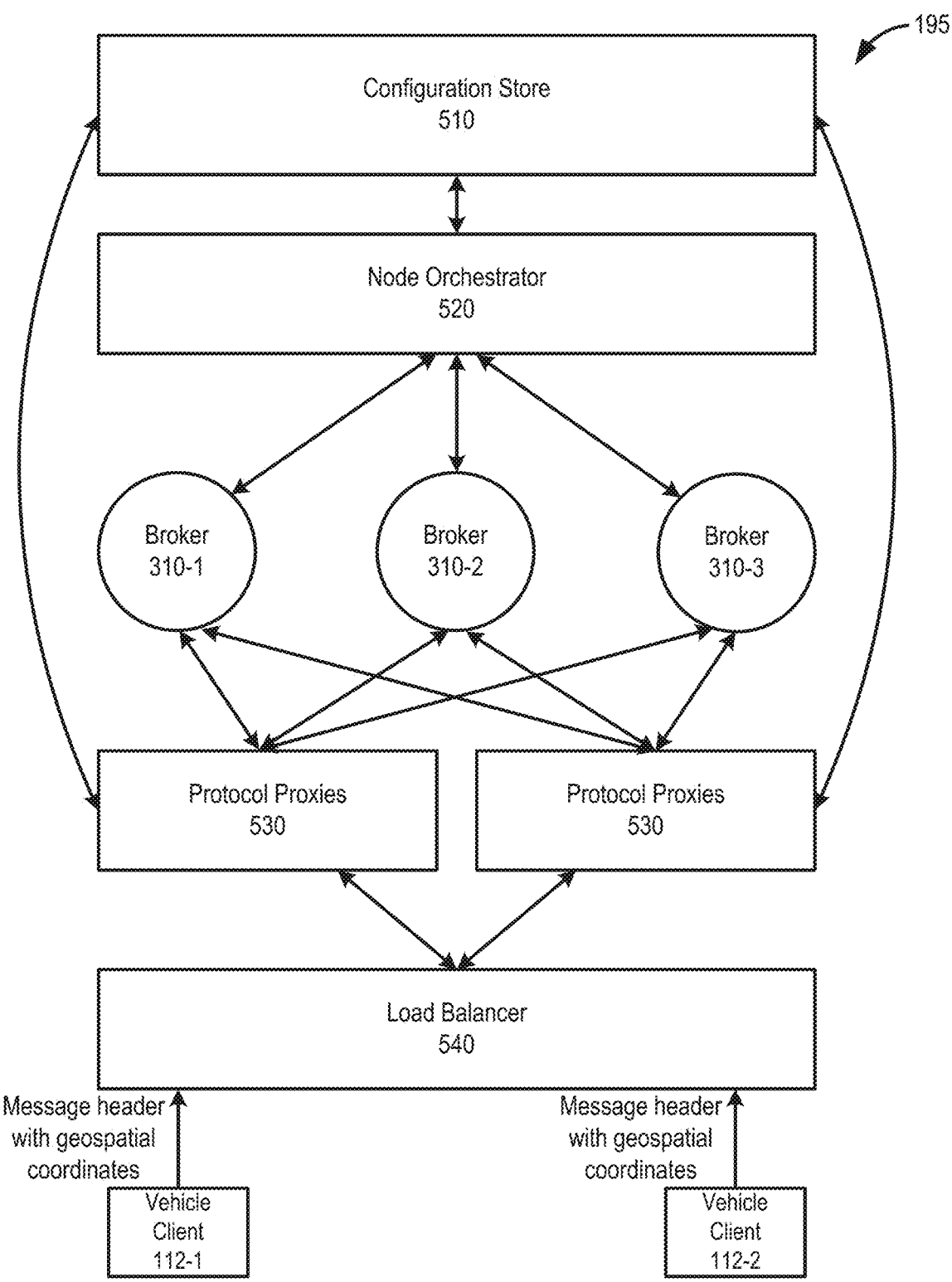
FIG. 5 is a diagram of a vRSU system that implements geo-aware routing, according to an implementation described herein.

FIG. 5 is a diagram of vRSU system 195 that implements geo-aware routing according to an implementation described herein. The vRSU system 195 may be configured to automatically segment large contiguous regions and balance loads properly as the system scales. More particularly, vRSU system 195 may dynamically define and assign geohashes in a selected region to scale vRSU loads. As shown in FIG. 5, vRSU system 195 may include one or more brokers 310, a configuration store 510, a node orchestrator 520, protocol proxies 530, and a load balancer 540. As further shown in FIG. 5, vRSU system 195 may service one or more vehicle clients 112 within a region of interest.

Vehicle client 112 may provide location messages (e.g., BSMs) to vRSU system 195 and receive messages from vRSU system 195. According to implementations described herein, vehicle client 112 may send location messages to vRSU system 195 using messages encoded with a custom routing header. The custom routing header may include geospatial coordinates, such as a current latitude value and a current longitude value of vehicle 110. The custom routing header may enable vRSU system 195 (e.g., protocol proxies 530) to rapidly extract location data and calculate geohash values to perform location-based routing without packet payload inspection. According to implementations described herein, the custom routing header may enable vRSU system 195 to quickly calculate geohash values and perform location-based routing to support round-trip latency requirements of less than 100 milliseconds.

Configuration store 510 may include a lookup table, routing rules, or a data structure used to store geohash-to-broker mapping. For example, each geohash tile in a region of interest (e.g., geohash tiles 410) may be assigned to a broker (e.g., broker 310) for a vRSU 300. The mapping can be relatively stable, but changes may occur occasionally when the number of brokers 310 (also referred to as a broker cluster) for vRSU system 195 expands or contracts. In other implementations, the number of geohash tiles 410 may be changed to accommodate traffic density/growth patterns. Configuration store 510 may be managed, for example, by node orchestrator 520.

Node orchestrator 520 may determine a grid of geohash tiles 410 covering a Region of Interest (ROI). For example, as described further in connection with FIG. 8, node orchestrator 520 may apply different geohash tiles 410 with varying levels of geohash precision to provide coverage of a ROI (e.g., an ROI defined by a network administrator). Node orchestrator 520 may also determine when the broker cluster (e.g., brokers 310 in a regional MEC network 140) should be expanded and contracted. Expansion/contraction decisions may be based on monitoring of thresholds for CPU usage, number of messages (e.g., to support services to vehicle clients 112), latency metrics, etc. For example, if an upper limit for a threshold is reached at a particular node (e.g., one of brokers 310), node orchestrator 520 can start to deploy a new broker 310 and map one or more geohash regions (e.g., geohash tiles 410) to the new broker 310. Conversely, if a lower threshold limit is reached, node orchestrator 520 may eliminate an existing broker 310 and redistribute coverage of the corresponding geohash tiles 410 to remaining brokers 310. The monitored metrics (e.g., for CPU usage, message volume, latency, etc.) may be read directly from the broker nodes 310 or from statistics collected by the protocol proxy 530. Cluster expansion is described further, for example, in connection with FIG. 9.

Broker 310 may serve as the front-end of a vRSU 300 to receive and publish V2X messages. For example, broker 310 may receive messages originating from vehicle clients 112 via protocol proxies 530 and route the messages to message stream processor 320. Broker 310 can use any of a variety of protocols, including Advanced Message Queuing. Protocol (ANIQP), MQTT protocol, a Kafka protocol, etc. According to implementations described herein, broker 310 can scale in and out quickly to support different load conditions.

Protocol proxies 530 represent a point of intersection between brokers 310 and vehicle clients 112. Protocol proxies 530 may intercept calls to broker 310, which can then be used to perform custom action. As an example, using MQTT, protocol proxies 530 may intercept messages from vehicle client 112 to perform the following: (a) During connect, protocol proxies 530 may intercept a message to perform authentication; (b) During publish, protocol proxies 530 may intercept to sort a message based on the routing header and re-publish the message to the correct broker 310 based on the rules in configuration store 510; (c) During subscribe, protocol proxies 530 may intercept to dynamically subscribe to receive messages from various geohashes that surround the vehicle client (e.g., in a manner that is transparent to the vehicle client). In other implementations, other protocols (e.g., QUIC, MQTT-SN, etc.) may be used.

According to an implementation, a protocol proxy 530 may receive and store routing rules (e.g., from configuration store 510) for associating each broker 310 with one or more geohash tiles 410. Protocol proxy 530 may receive a message from a vehicle client 112 (e.g., when vehicle 110 is in the region of interest serviced by MEC network 140). The message may include a message header that identifies geospatial coordinates of vehicle 110. Protocol proxy 530 may calculate a geohash based on the geospatial coordinates in the message header and associate, based on the geohash and the routing rules, the message with one of brokers 310. For example, protocol proxy 530 may match a portion of the calculated geohash to a smallest geohash tile (e.g., with the longest matching character string) in the routing rules and identify a corresponding vRSU from the routing rules. Protocol proxy 530 may then route the message to the appropriate broker 310/vRSU 300 assigned to manage the geohash tile 410 where vehicle 110/vehicle client 112 is located.

According to another implementation, protocol proxy 530 may receive an indication that vehicle client 112 is connected/subscribed for vRSU services and calculate geohashes corresponding to the surrounding geohash tiles for vehicle client 112 based on the current geohash (e.g., calculated from geospatial coordinates in a message header in a message from vehicle client 112). Protocol proxy 530 may subscribe to vRSUs associated with the surrounding geohash tiles and forward to vehicle client 112 location messages from vehicles in areas corresponding to the surrounding geohash tiles.

Load balancer 540 may include a network device/function to load balance messages among multiple protocol proxies 530. Load balancer 540 may redirect calls to various protocol proxies 530, allowing vRSU system 195 to scale broker clusters. The configuration of load balancer 540 may vary depending on the protocol used for protocol proxies 530. Regardless of configuration, load balancer 540 should maintain vehicle client 112 sessions with the same protocol proxy 530.

Figure 6:
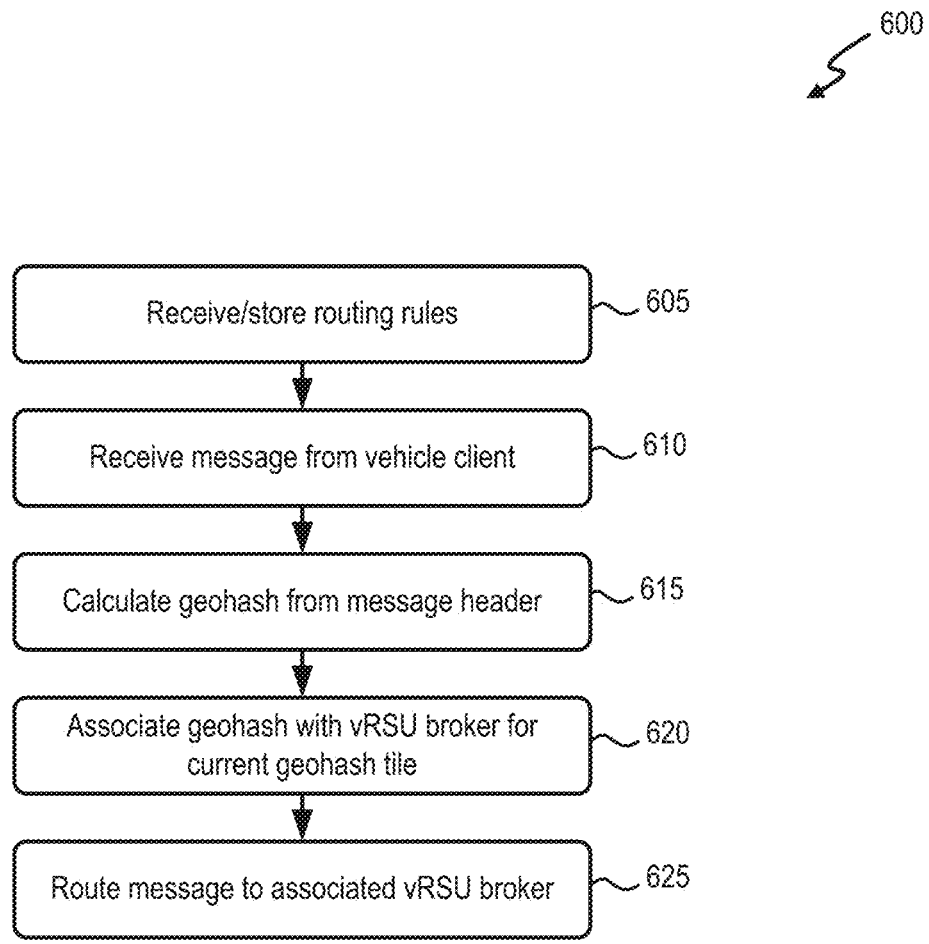
FIG. 6 is a flow diagram of a process for performing location-based routing of incoming messages in a vRSU system, according to an implementation described herein.

FIG. 6 is flow diagram of a process 600 for performing location-based routing of incoming messages in a vRSU system. In one implementation, process 600 may be performed by a protocol proxy 530 instantiated on a MEC device 145.

Referring to FIG. 6, process 600 may include receiving and storing routing rules (block 605) and receiving a message from a vehicle client (block 610). For example, protocol proxy 530 may retrieve from configuration store 510 policy rules associating geohash tiles 410, for a region of interest, with one or more vRSU brokers 310. Protocol proxy 530 may later receive a message (e.g., a BSM) from a vehicle client 112 (e.g., via load balancer 540). The message may include a message header that identifies geospatial coordinates (e.g., current latitude and longitude values) of the vehicle.

Process 600 may further include calculating a geohash from the message header (block 615), associating the geohash with a vRSU broker for the current geohash tile (block 620), and routing the message to the associated vRSU broker (block 625). For example, protocol proxy 530 may calculate a geohash based on the geospatial coordinates in the message header and match the vehicle geohash to the geohash tile in the stored routing rules with the most matching leading digits. As an example, a vehicle geohash of "6gj7p71y4z" (e.g., precise to about 1 square meter) may be included within a geohash of "6gj7p7" (e.g., defining a geohash tile of about 1.2 km by 0.6 km, when near the equator). Protocol proxy 530 may use the routing rules to identify the vRSU broker 310 assigned to the identified geohash tile 410 and route the message from vehicle client 112 to the correct vRSU broker 310.

Figure 7:
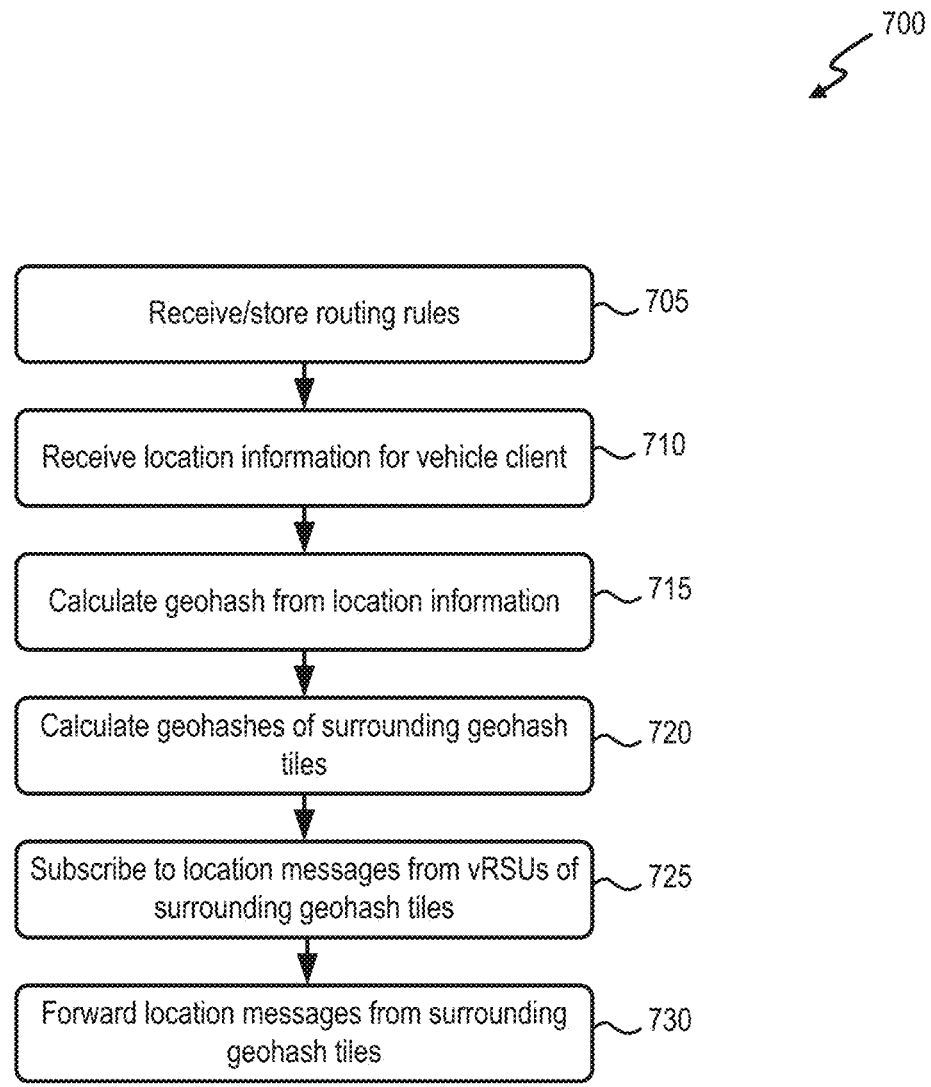
FIG. 7 is a flow diagram of a process for performing location-based routing of outgoing messages in a vRSU system, according to an implementation described herein.

FIG. 7 is flow diagram of a process 700 for performing location-based routing of outgoing messages in a vRSU system. In one implementation, process 700 may be performed by a protocol proxy 530 instantiated on a MEC device 145. Although process 700 is described as a separate process in FIG. 7, in other implementations, portions of process 600 and process 700 may overlap and/or be combined.

Referring to FIG. 7, process 700 may include receiving and storing routing rules (block 705) and receiving location information for a vehicle client (block 710). For example, as described above in connection with FIG. 6, protocol proxy 530 may retrieve policy rules from configuration store 510. Protocol proxy 530 may later receive an indication (e.g., from vRSU or from an incoming message header from a vehicle client 112) of a vehicle client 112 location.

Process 700 may further include calculating a geohash from the location information (block 715), calculating geohashes of geohash tiles surrounding the current geohash tile (block 720). For example, protocol proxy 530 may calculate a geohash based on the geospatial coordinates in the message header from vehicle client 112 and match the vehicle geohash to the geohash tile in the stored routing rules with the most matching leading digits. Protocol proxy 530 may then calculate the geohashes for geohash tiles surrounding the geohash tile. There may be eight surrounding geohash tiles 410, if all tiles are of equal size. There may be more or fewer surrounding tiles, depending on the size/precision of adjacent geohash tiles 410 in the geohash tile map used by node orchestrator 520.

Process 700 may also include subscribing to location messages from vRSUs of the surrounding geohash tiles (block 725) and forwarding the location messages from the surrounding geohash tiles to the vehicle client (block 730). For example, using the policy rules from configuration store 510, protocol proxy 530 may subscribe to the vRSUs (e.g., vRSU brokers 310) that are assigned to each of the surrounding geohash tiles 410. Protocol proxy 530 may immediately begin to receive message for the surrounding geohash tiles and send the messages (along with message from vehicle client 112 associated with the current geohash tile) to vehicle client 112.

Figure 8:
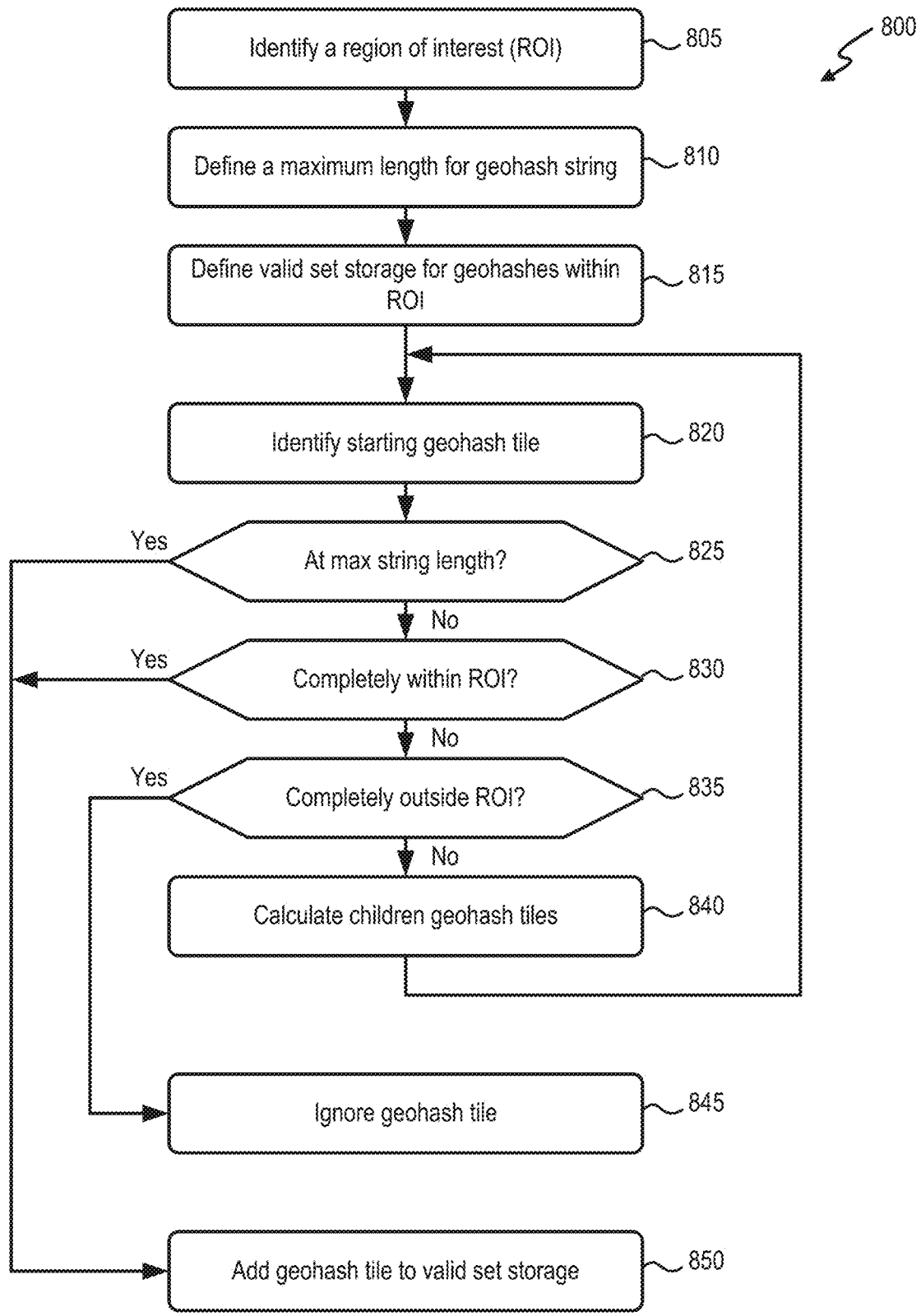
FIG. 8 is a flow diagram of a process for assigning geohash tiles for a vRSU system, according to an implementation described herein.

FIG. 8 is flow diagram of a process 800 for assigning geohash tiles for a vRSU system. More particularly, process 800 may be used to define a geohash tile map for use with configuration store 510. In one implementation, process 800 may be performed by a node orchestrator 520 instantiated on a MEC device 145. In another implementation, process 800 may be performed by node orchestrator 520 in conjunction with one or more other MEC devices 145.

Process 800 may include identifying a region of interest for a vRSU system (block 805), defining a maximum length for a geohash string (block 810), and defining storage for a valid set of geohashes within the region of interest (block 815). For example, node orchestrator 520 may receive from a network administrator a defined region (e.g., multi-state area, a state, a city, a municipality, etc.) for which vRSU services will be provided. Node orchestrator 520 may select, or the network administrator may define, a smallest geohash tile size (e.g., corresponding to a maximum length of a geohash string) for use in the region of interest. For example, a six-digit geohash may provide a geohash tile size of about 1.2 km by 0.6 km (near the equator), while a seven-digit geohash may provide a geohash tile size of about 152 square meters. Node orchestrator 520 may define storage for the geohashes that will define the region of interest.

Process 800 may further include identifying a starting geohash tile (block 820) and determining if the geohash for the tile is at the maximum length (block 825). For example, node orchestrator 520 may start with a single large geohash that covers the entire region of interest. Node orchestrator 520 may compare the number of digits in the selected geohash with the maximum length to determine if a smaller size geohash (e.g., more geohash digits) can be used.

If the geohash for the tile is not at the maximum length (block 825—No), process 800 may include determining if the geohash tile is completely within the ROI (block 830). For example, node orchestrator 520 may determine if the entire bounds defined by the selected geohash tile are within the region of interest.

If the geohash tile is not completely within the ROI (block 830—No), process 800 may include determining if the geohash tile is completely outside the ROI (block 835). For example, node orchestrator 520 may determine if the entire bounds defined by the selected geohash tile are outside the region of interest.

If the geohash tile is not completely outside the ROI (block 835—No), process 800 may include calculating children geohash tiles from the selected geohash tile (block 840). For example, node orchestrator 520 may determine that a selected geohash tile is partly within and partly outside a region of interest. Node orchestrator 520 may subdivide the selected geohash tile into 32 smaller tiles, with its geohash obtained by adding an additional digit to the geohash of the selected geohash tile. Process 800 may then return to block 820 to select a next geohash tile (e.g., one of the children geohash tiles) for analysis.

If the geohash is completely outside the ROI (block 835—Yes), process 800 may include ignoring the selected geohash tile (block 845). If the geohash for the tile is at the maximum length (block 825—Yes) or if the geohash tile is completely within the ROI (block 830—Yes), the selected geohash tile may be added to the valid set storage (block 850). For example, when a geohash tile under consideration is at the highest precision or completely within a region of interest, node orchestrator 520 may add the geohash to the defined set that will be included in configuration store 510 for the region of interest.

Figure 9:
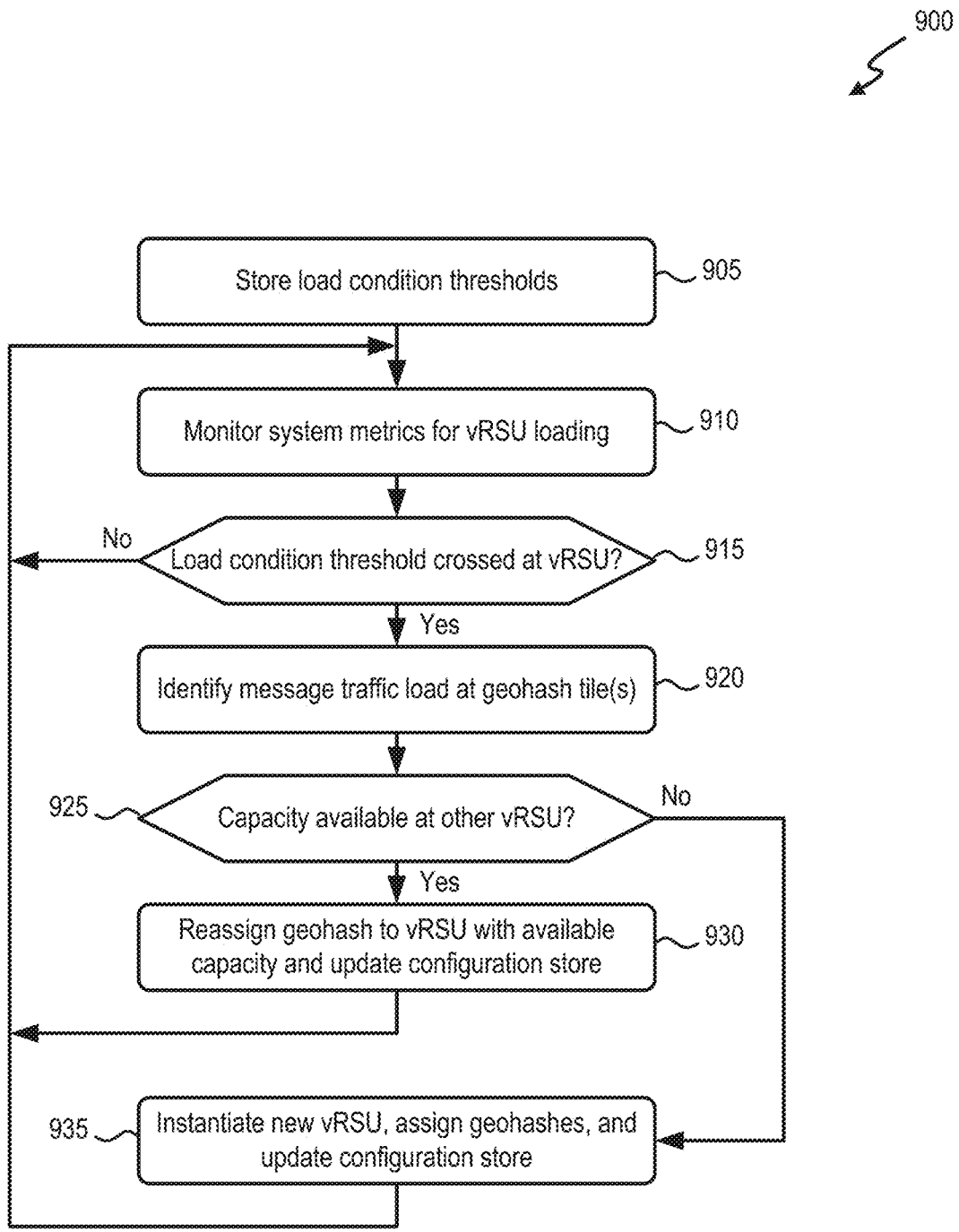
FIG. 9 is a flow diagram of a process for managing vRSU cluster assignments in a vRSU system, according to an implementation described herein.

FIG. 9 is flow diagram of a process 900 for managing vRSU cluster assignments in a vRSU system. In one implementation, process 900 may be performed by a node orchestrator 520 instantiated on a MEC device 145. In another implementation, process 800 may be performed by node orchestrator 520 in conjunction with one or more other MEC devices 145.

Process 900 may include storing load condition thresholds (block 905) and monitoring system metrics for vRSU loading (block 910). For example, a network administrator may select low and/or high threshold for one or more metrics to define optimal resource usage. Thresholds may indicate, for example, high loads (indicating a need for additional vRSUs) or low loads (e.g., indicating a need to reduce the number of vRSUs). Node orchestrator 520 may then periodically collect system metrics from each broker 310, such as CPU use, network latency, memory use, etc. According to an implementation, node orchestrator 520 may collect metrics from brokers at regular intervals (e.g., collect metrics every 30 seconds, 2 minutes, etc.).

Process 900 may further include determining whether a load condition threshold is crossed by a vRSU (block 915). For example, node orchestrator 520 may average system metric output over a period of time (e.g., minutes or seconds) to ensure an elevated results are not caused by a spike. In another implementation, a hysteresis region for the metrics may be defined.

If a load condition threshold is crossed by a vRSU (block 915—Yes), process 900 may include identifying a message traffic loads for individual geohash tiles (block 920) and determining if there is available capacity at other vRSUs (block 925). For example, if a (or combination of) metric hits a predefined upper limit on one of brokers 310, node orchestrator 520 may identify load levels from individual geohash tiles. Node orchestrator may aggregate statistics (e.g., a number of messages or connection per geohash tile) from every protocol proxy 530. Using the aggregated statistics and the mapping from the configuration store 510, node orchestrator 520 can determine which geohash tiles (e.g., geohash tiles 410) should be removed from a current vRSU system 195 to achieve desired load levels.

If there is available capacity at other vRSUs (block 925—Yes), process 900 may include reassigning a geohash to a vRSU with available capacity and updating the configuration store to reflect the new geohash assignments (block 930). For example, node orchestrator 520 may remove geohash assignment from the overloaded (or underloaded) broker 310 and update the geohash to broker mapping in configuration store 510. According to an implementation, if the geohash re-assignments result in an unused vRSU, node orchestrator 520 may remove the unused vRSU 300/broker 310 from service.

If there is not available capacity at other vRSUs (block 925—No), process 900 may include instantiating a new vRSU, assigning geohashes to the new vRSU, and updating the configuration store (block 935). For example, node orchestrator 520 may assign additional resources from a MEC device 145 to instantiate a new vRSU 300. Node orchestrator 520 may remove geohash assignment from the overloaded (or underloaded) broker 310 and update the geohash to broker mapping in configuration store 510. Thus, node orchestrator 520 may reassign geohash tiles to help bring each vRSU 300 that is above preferred loading values down and add the tiles to a new vRSU node.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 6-9, and message/operation flows with respect to FIG. 5, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
   a network node including a first processor configured to:
      receive routing rules associating geohash tiles, for a region of interest, with one or more virtual Road-side Units (vRSUs);
      receive a message from a vehicle client in the region of interest, wherein the message includes a message header that identifies geospatial coordinates of a vehicle;
      calculate a geohash based on the geospatial coordinates in the message header;
      associate, based on the routing rules, the geohash with one of the vRSUs; and
      route, based on the associating, the message to the one of the vRSUs.

2. The system of claim 1, wherein the network node and each vRSU are instantiated in a multi-access edge compute cluster.

3. The system of claim 1, wherein the first processor is further configured to:
   store the routing rules in a lookup table.

4. The system of claim 1, wherein the geospatial coordinates include a latitude value and a longitude value.

5. The system of claim 1, further comprising:
   an orchestration device including a second processor that is configured to:
      determine a grid of geohash tiles covering the region of interest.

6. The system of claim 5, wherein, when determining a grid of geohash tiles covering the region of interest, the second processor is further configured to:
   define a minimum resolution for a geohash string;
   define storage for a valid set of geohashes within the region of interest;
   identify a geohash tile that covers the region of interest; and
   if the geohash tile overlaps an ROI boundary, calculate children tiles for the geohash tile.

7. The system of claim 1, wherein the first processor is further configured to:
   receive a subscription indication for the vehicle client;
   calculate, based on the geohash, geohash tiles surrounding a vehicle client; and
   forward, in response to the subscription indication, location messages from vehicle clients in the surrounding geohash tiles.

8. The system of claim 7, wherein, when forwarding the location messages, the first processor is further configured to:
   subscribe to vRSUs associated with the surrounding geohash tiles.

9. The system of claim 1, further comprising:
   an orchestration device including a second processor configured to:
      monitor system metrics of the network node and other network nodes in an edge cluster;
      identify a high load condition at the network node;
      assign, based on the identifying, one or more of the geohash tiles, for the region of interest, to one of the other network nodes;
      update the routing rules to reflect the assigning; and
      forward, to the network node and other network nodes, the updated routing rules.

10. The system of claim 1, wherein the message from the vehicle client includes a positional message for a vehicle-to-everything (V2X) system.

11. A method, comprising:
    receiving, by a network node, routing rules associating geohash tiles, for a region of interest, with one or more virtual Road-side Units (vRSUs);
    receiving, by the network node, a message from a vehicle client in the region of interest, wherein the message includes a message header that identifies geospatial coordinates of a vehicle;
    calculating, by the network node, a geohash based on the geospatial coordinates in the message header;
    associating, by the network node, the geohash with one of the vRSUs based on the routing rules; and
    routing, by the network node and based on the associating, the message to the one of the vRSUs.

12. The method of claim 1, further comprising:
    storing, by the network node, the routing rules in a lookup table.

13. The method of claim 1, wherein the geospatial coordinates include a latitude value and a longitude value.

14. The method of claim 1, wherein associating the geohash with one of the vRSUs includes:
matching a portion of the geohash to a smallest geohash tile in the routing rules; and
identifying a corresponding vRSU, in the routing rules, for the smallest geohash tile.

15. The method of claim 1, further comprising:
determining a grid of geohash tiles covering the region of interest.

16. The method of claim 1, further comprising:
receiving a subscription indication for the vehicle client;
calculating, based on the geohash, geohash tiles surrounding a vehicle client; and
forwarding, in response to the subscription indication, location messages from vehicle clients in the surrounding geohash tiles.

17. The method of claim 1, further comprising:
identifying a high load condition at the network node;
instantiating a new network node instance;
assigning, based on the identifying, one or more of the geohash tiles, for the region of interest, to the new network node instance;
updating the routing rules to reflect the assigning; and
forwarding, to the network node and the new network node instance, the updated routing rules.

18. A non-transitory computer-readable medium containing instructions, executable by at least one processor, for:
receiving, by a network node, routing rules associating geohash tiles, for a region of interest, with one or more virtual Road-side Units (vRSUs);
receiving, by the network node, a message from a vehicle client in the region of interest, wherein the message includes a message header that identifies geospatial coordinates of a vehicle;
calculating, by the network node, a geohash based on the geospatial coordinates in the message header;
associating, by the network node, the geohash with one of the vRSUs based on the routing rules; and
routing, by the network node and based on the associating, the message to the one of the vRSUs.

19. The non-transitory computer-readable medium claim 18, further comprising instructions for:
storing, by the network node, the routing rules in a lookup table.

20. The non-transitory computer-readable medium claim 18, wherein the instructions for associating the geohash with one of the vRSUs further comprise instructions for:
matching a portion of the geohash to a smallest geohash tile in the routing rules; and
identifying a corresponding vRSU, in the routing rules, for the smallest geohash tile.

* * * * *